3,180,219
REAR VIEW MIRROR HAVING TWO RELATIVELY ADJUSTABLE REFLECTING SURFACES
Alexander A. Ruiz and Sallie C. Ruiz, both of 11694 Picturesque Drive, Studio City, Los Angeles, Calif.
Filed Dec. 5, 1960, Ser. No. 73,698
3 Claims. (Cl. 88—87)

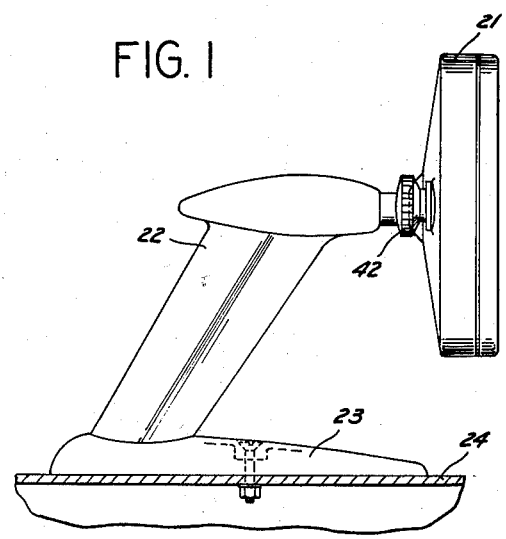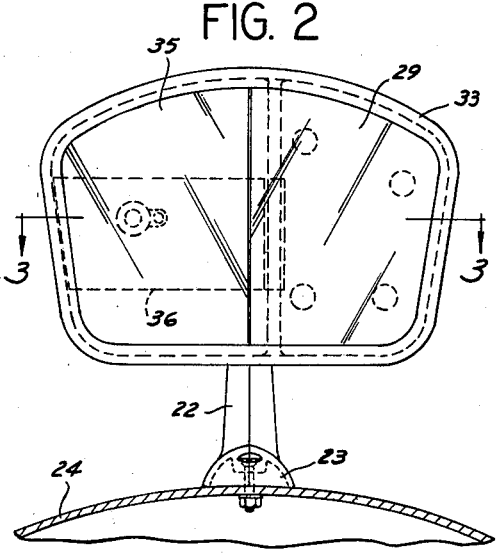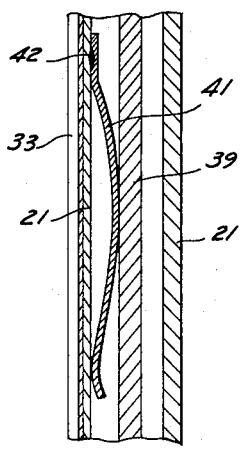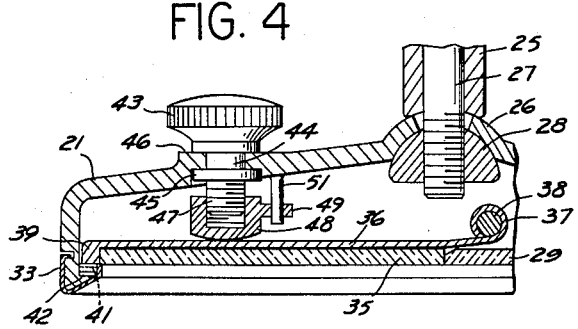

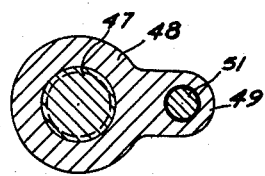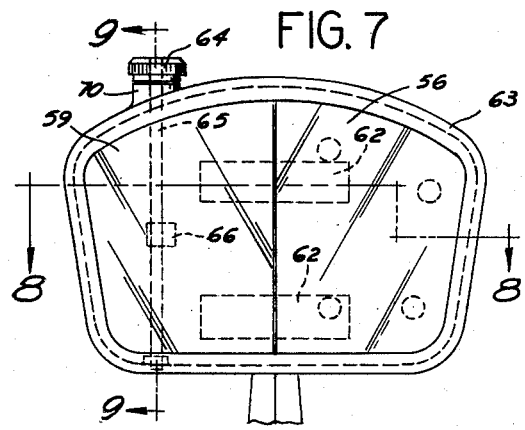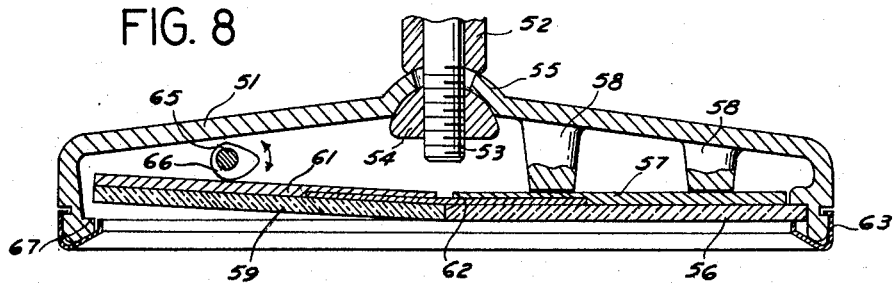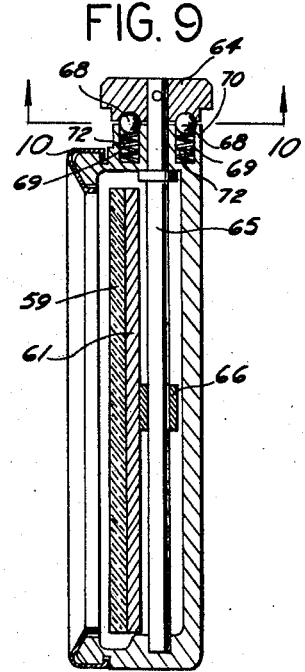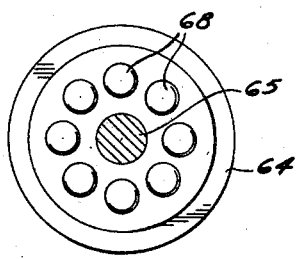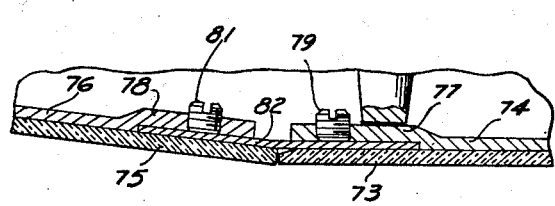
INVENTORS.
ALEXANDER A. RUIZ
SALLIE C. RUIZ
ATTORNEY

United States Patent Office 3,180,219
Patented Apr. 27, 1965

This invention relates to a split view mirror for automotive or other vehicles and more particularly to a rear view mirror of general utility which provides dual vision in two separate sectors accurately adjustable with respect to each other and readily adjustable with respect to the vehicle or other member on which it is mounted.

Many different types of mirrors have been designed to increase the field of view of rear view mirrors, and certain of these mirrors have been made with two or more sections which are pivotally mounted with respect to each other, however these prior devices relied on friction to hold the sections in their adjusted angular relation and could not be easily adjusted with any degree of accuracy. In addition, during normal use these prior devices tended, generally, to become loose and allow the mirrors to slip out of adjustment. The present invention embodies highly practical means for overcoming all of these defects.

Briefly stated, in the two preferred modifications of the present invention illustrated herein, two mirror sections are provided with one section rigidly mounted in a casing and the other moveable section is pivotally or otherwise mounted for angular movement about an axis extending along the proximate edges of the two sections. Resilient means is provided for urging the moveable section in one direction, such as toward the back of the casing and finely adjustable means is provided for urging the moveable section in the opposite direction against the resilient means.

One object of the present invention is to provide a split view mirror to be mounted either outside or inside an automobile, truck or other vehicle having dual vision in two reflecting surfaces which may be adjusted with respect to each other and to the vehicle on which it is mounted to permit the operator to observe in a single glance the area to the side as well as to the rear of his vehicle and to eliminate the so-called blind spot from his rearward view.

Another object of the invention is to provide means for quickly, conveniently and accurately adjusting the relative positions of the two mirrors with respect to each other and to the vehicle and for holding the mirrors fixed in the selected positions despite any vibration or jarring caused by the motion of the vehicle.

Another object of the invention is to provide a casing to hold the mirrors and their adjusting means which is economical to produce, sturdy and attractive.

Other objects and many of the attendant advantages of this invention will be readily appreciated as the same becomes better understood by reference to the following detailed description when considered in connection with the accompanying drawings wherein:

FIGURE 1 is a side elevation view illustrating one preferred embodiment of the split view mirror of the present invention mounted on a fender or other part of an automotive vehicle;

FIGURE 2 is a front elevation view of the mirror as shown in FIGURE 1;

FIGURE 3 is a sectional view taken on the line 3—3 of FIGURE 2;

FIGURE 4 is a partial sectional view taken on the line 3—3 of FIGURE 2 and similar to FIGURE 3 but showing the adjustment means extended to rotate the moveable mirror section into a different position substantially flush with the fixed section of the mirror;

FIGURE 5 is a sectional view taken on the line 5—5 of FIGURE 3;

FIGURE 6 is a sectional view taken on the line 6—6 of FIGURE 3;

FIGURE 7 is an elevational view with portions broken away illustrating another preferred embodiment of the present invention with a different type of adjustment mechanism;

FIGURE 8 is a sectional view taken on the line 8—8 of FIGURE 7;

FIGURE 9 is a sectional view taken on the line 9—9 of FIGURE 7;

FIGURE 10 is a sectional view taken on the line 10—10 of FIGURE 9; and

FIGURE 11 is a partial sectional view similar to FIGURE 8 but illustrating another modification of a means for moveably mounting one mirror section with respect to the other.

Referring now to the drawings in detail and more particularly to the modification illustrated in FIGURES 1 through 6, the mirror assembly including a casing 21 is universally mounted on a standard or support 22 which may be integrally formed with a base member 23 which may be secured to any suitable support such as the fender, dashboard or windshield molding on the outside or inside of an automotive vehicle 24 by mounting means such as screws (one shown).

The universal mounting for the casing 21 on the standard 22 preferably consists of a ball and socket joint with a threaded tubular element 25 rigidly mounted on the standard 22 and having a concave face engaging the convex outer surface of a spherically formed portion 26 in the casing 21. A hemispherical nut 28 is threaded on the outer end of the stud 27 which is mounted in the sleeve or tubing 25.

The fixed mirror section 29 is preferably mounted rigidly on a plurality of posts 31 integrally or otherwise formed or mounted on the casing 21 and also seats against a flange 32 formed in the side walls of the casing 21.

If desired, the casing may also be provided with a trim molding 33 which engages in a peripheral groove 34 around the edge of the casing 21 and also serves to assist in retaining the mirror sections in position within the casing 21.

The other moveable mirror section 35 in this modification is rigidly mounted on a backing plate 36 by suitable adhesive or other means. Backing plate 36 is provided with a hinge portion 37 which engages around a hinge pin 38 secured at its upper and lower ends to the casing 21 as by welding or other means to provide the pivotal mounting of moveable mirror section 35.

The backing plate 36 may be provided with a lip or flange 39 which engages a leaf spring 41 secured as by welding or soldering at 42 to the casing 21 and resiliently urging the moveable mirror section on the backing plate 36 toward the back of the casing 21.

An adjustment knob 43 is rotatably mounted in the back of the casing 21 behind the moveable mirror section 35 in a position to engage the backing plate 36. The shaft 44 on the knob 43 extends through the casting 21 and is provided with a collar 45 to prevent axial movement thereof. The adjustment knob 43 also engages the flat surface of a boss 46 and is provided with a threaded extension 47 which engages the threaded bore in a cup-shaped member 48 which contacts the backing plate 36 for movement of the mirror section 35. The cup-shaped member 48 is provided with a lug or ear 49 having an aperture therethrough which is engaged by a pin 51 integrally or otherwise formed or mounted on the casing 21 to prevent rotation of the cup-shaped member 48.

It will be apparent that as the adjustment knob 43 is rotated, the cup-shaped member 48 will be moved outwardly from the position shown in FIGURE 3 to the position shown in FIGURE 4, thus moving the mirror section 35 from the angular position of FIGURE 3 to the position in FIGURE 4 where it is substantially flush with the fixed section 29.

Another preferred embodiment is illustrated in FIGURES 7 through 10 wherein the moveable mirror section is pivotally mounted and also resiliently urged towards the rear of the casing by a pair of flat leaf springs secured to and joining both mirror sections, and is urged toward the front of the casing by cam means which will be described in detail.

More specifically, the casing 51 in FIGURE 8 is also provided with a ball and socket joint for universal mounting to a standard 52 by means of the threaded stud 53 and the hemispherical member 54 engaging the spherically shaped portion 55 on the casing 51.

The fixed mirror section 56 is rigidly secured to a backing plate 57 which in turn may be secured to the mounting posts 58 formed or mounted on the casing 51. Likewise, the moveable mirror section 59 is also secured to a backing plate 61 and both sections are pivotally and resiliently joined by means of one or preferably two flat leaf springs 62 and 62 which are positioned in suitable recesses formed in the backing plates 57 and 61 and are permanently bent to provide the desired resilient force operating toward the rear of the casing 51.

The trim molding 63 around the edge of the casing 51 adds to the appearance of the device and also helps to maintain the fixed and moveable mirror sections in assembled relation as well as limiting the outward movement of the moveable section 59 to a position where it is flush with the fixed mirror section 56.

In this modification, the outward movement of the moveable section 59 is controlled by the adjustment or control knob 64 mounted on one end of a shaft 65 extending through the casing 51 as illustrated in FIGURES 7 and 9. The shaft 65 also has a cam 66 rigidly mounted thereon which engages the backing plate 61 for movement outwardly from the position shown in FIGURE 8 to a position where it engages the lip or flange 67 on the casing 61 and where it is substantially flush with the fixed section 56.

In order to hold the adjusting knob 64 and cam 66 securely in any desired position, detent means is provided preferably in the form of a ball detent consisting of a plurality of balls 68 which are resiliently pressed by a plurality of coil springs 69 into a plurality of spherically shaped detents 71 formed in the adjusting knob 64. The coil springs 69 are mounted within a plurality of cylindrical recesses 72 in the boss 70 integrally formed on the casing 51.

It will be seen that the cam 66 can be rotated to any desired position for adjustment of the moveable section 59 by rotating the adjusting knob 64 and will be retained in the adjusted position by means of the ball detent mechanism illustrated in FIGURE 9.

Although the backing plates 57 and 61 have been shown in FIGURE 8 as being permanently secured to the resilient hinge plates 62 and to the mirror sections 56 and 59, as by adhesives, it is to be observed that the backing plates may be detachably mounted on the hinge plates in the manner illustrated in FIGURE 11 wherein the fixed mirror section 73 is rigidly attached as by an adhesive to the backing plate 74 and the moveable mirror section 75 is rigidly attached as by adhesive to the backing plate 76, but the backing plates 74 and 76 are provided with offset portions 77 and 78 with set screws 79 and 81 extending therethrough to engage the hinge plates 82. It will be apparent that the two backing plates 74 and 76 with the mirror sections 73 and 75 may be readily separated by loosening either one or both of the set screws 79 and 81 for replacement thereof.

It will be noted that in all the modifications illustrated herein the moveable mirror section is pivotally or otherwise moveably mounted with respect to the fixed mirror section and the moveable mirror section is resiliently urged toward the back of the casing. Means is also provided in both modifications for adjustably urging the moveable section toward the front of the casing in alignment with the fixed section so that the two sections may be readily and accurately adjusted with respect to each other to provide dual vision in two separate sectors, and the whole assembly may be readily adjusted to vary the angle of both mirrors with respect to the vehicle or other member on which it is mounted.

Obviously, many other modifications and variations of the present invention may be made within the scope of the following claims.

What is claimed is:

1. A split view mirror comprising a casing, a fixed mirror section rigidly mounted in one side of said casing, a hinge pin mounted in said casing parallel to the inner edge of said fixed mirror section, a moveable backing plate pivotally mounted on said hinge pin, a mirror section mounted on said moveable backing plate with its inner edge proximate to the inner edge of said fixed mirror section, resilient means mounted in one end of said casing adjacent to and engaging the outer end of said moveable backing plate for resiliently urging said moveable backing plate and mirror section toward the back of said casing, finely adjustable means including a control knob rotatably mounted in the back of said casing behind said moveable backing plate and mirror section and having a threaded extension thereon, a cup-shaped member having a threaded bore engaging said threaded extension and a lug having an aperture therethrough, a pin mounted on said casing and extending through the aperture in said lug to prevent rotation of said cup-shaped member whereby said cup-shaped member may be moved inwardly and outwardly with respect to said casing by said control knob and engage said moveable backing plate for angular movement of said moveable backing plate and mirror section with respect to said fixed mirror section.

2. A split view mirror comprising a casing, a fixed mirror section rigidly mounted in one side of said casing, a hinge pin mounted in said casing parallel to the inner edge of said fixed mirror section, a moveable plate pivotally mounted on said hinge pin, a mirror section mounted on said moveable backing plate with its inner edge proximate to the inner edge of said fixed mirror section, a leaf spring mounted in one end of said casing adjacent to and engaging the outer end of said moveable backing plate for resiliently urging said moveable plate and mirror section toward the back of said casing, finely adjustable means including a control knob rotatably mounted in the back of said casing behind said moveable backing plate and mirror section and having a threaded extension thereon, a cup-shaped member having a threaded bore engaging said threaded extension and a lug having an aperture therethrough, a pin mounted on said casing and extending through the aperture in said lug to prevent rotation of said cup-shaped member whereby said cup-shaped member may be moved inwardly and outwardly with respect to said casing by said control knob and engage said moveable backing plate for angular movement of said moveable backing plate and mirror section with respect to said fixed mirror section.

3. A split view mirror comprising a casing, ball and socket means for universally mounting said casing on a support, a plurality of posts formed in one side of said casing, a fixed mirror section rigidly mounted on said posts, a hinge pin mounted in said casing parallel to the inner edge of said fixed mirror section, a moveable plate pivotally mounted on said hinge pin, a mirror section mounted on said moveable backing plate with its inner edge proximate to the inner edge of said fixed mirror section, a leaf spring mounted in one end of said casing adjacent to and engaging the outer end of said moveable backing plate for resiliently urging said moveable backing plate of the mirror section toward the back of said casing, finely adjustable means including a control knob rotatably mounted in the back of said casing behind said moveable backing plate and mirror section and having a threaded extension thereon, a cup-shaped member having a threaded bore engaging said threaded extension and a lug having an aperture therethrough, a pin mounted on said casing and extending through the aperture in said lug to prevent rotation of said cup-shaped member whereby said cup-shaped member may be moved inwardly and outwardly with respect to said casing by said control knob and engage said moveable backing plate for angular movement of said moveable backing plate and mirror section with respect to said fixed mirror section.

References Cited by the Examiner

UNITED STATES PATENTS

| | | | |
|---|---|---|---|
| 769,868 | 9/04 | May | 88—92 X |
| 2,042,257 | 5/36 | Harrison et al. | |
| 2,432,984 | 12/47 | Buddenbom. | |
| 2,473,231 | 6/49 | Wager | 88—84 X |
| 2,534,495 | 12/50 | Younghusband | 88—93 X |
| 2,582,651 | 1/52 | Peterson | 88—87 |
| 2,600,906 | 6/52 | Mottu | 88—73 X |
| 2,979,989 | 4/61 | Calder | 88—87 |

FOREIGN PATENTS

| | | |
|---|---|---|
| 329,694 | 6/03 | France. |
| 839,129 | 12/38 | France. |
| 854,885 | 11/60 | Great Britain. |

JEWELL H. PEDERSEN, *Primary Examiner.*

WILLIAM MISIEK, *Examiner.*